United States Patent [19]

Lowry, Sr.

[11] 4,369,398

[45] Jan. 18, 1983

[54] METHOD AND APPARATUS FOR MONITORING VIBRATING EQUIPMENT

[75] Inventor: George W. Lowry, Sr., Balch Springs, Tex.

[73] Assignee: Triple/S Dynamics, Inc., Dallas, Tex.

[21] Appl. No.: 128,023

[22] Filed: Mar. 7, 1980

[51] Int. Cl.³ ............................................ H02K 33/00
[52] U.S. Cl. .................................. 318/114; 318/128; 198/751; 340/683
[58] Field of Search ...................... 318/128, 114, 129; 198/751, 762; 340/683

[56] References Cited

U.S. PATENT DOCUMENTS

| | | | |
|---|---|---|---|
| 2,935,672 | 5/1960 | Ross | 318/128 |
| 3,504,250 | 3/1970 | Stevens, Jr. et al. | 318/128 |
| 3,594,621 | 7/1971 | Stechman | 318/128 |
| 4,216,416 | 8/1980 | Grace | 318/128 |

Primary Examiner—B. Dobeck
Attorney, Agent, or Firm—Fitch, Even, Tabin, Flannery & Welsh

[57] ABSTRACT

An apparatus and method for detecting overstroke, understroke and/or overspeed, underspeed conditions in vibratory equipment includes a vibratory member mounted on the equipment to vibrate therewith and to operate solid-state switches over a large number of cycles. The preferred switches are Hall effect switches operable by a magnet carried by the vibratory member. During normal vibratory motion, a normal stroke Hall effect switch resets a timing means which will operate as a missing pulse detector and will generate an abnormal pulse if it is not reset during a predetermined period of time. If the amplitude is too large, the overstroke Hall effect switch is operated and causes an abnormal condition pulse. A control circuit means is operable by an abnormal pulse to generate an alarm and/or shut down the vibrating equipment. An initial start-up means operates for an initial predetermined time period to inhibit said control circuit from shutting down or alarming due to a transient vibratory condition during the start-up of the equipment.

19 Claims, 5 Drawing Figures

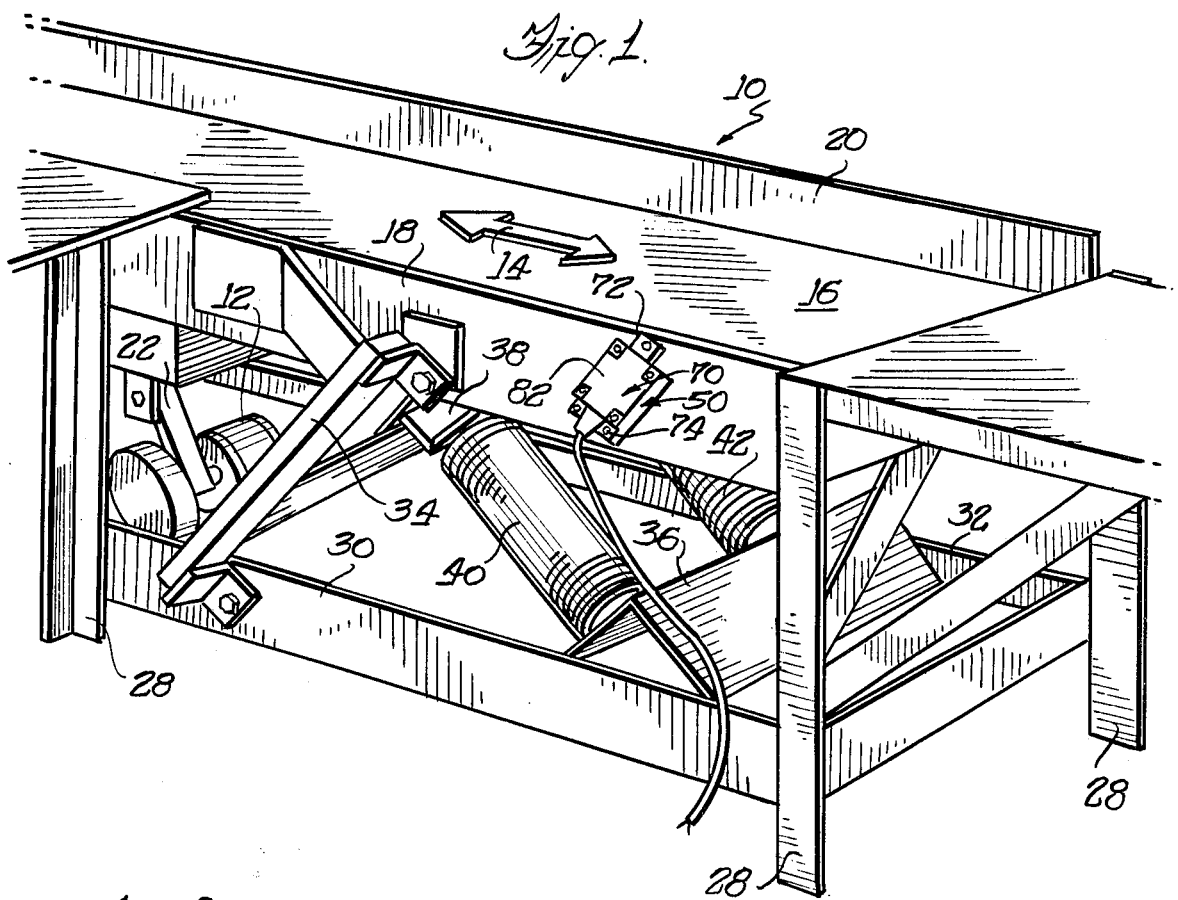
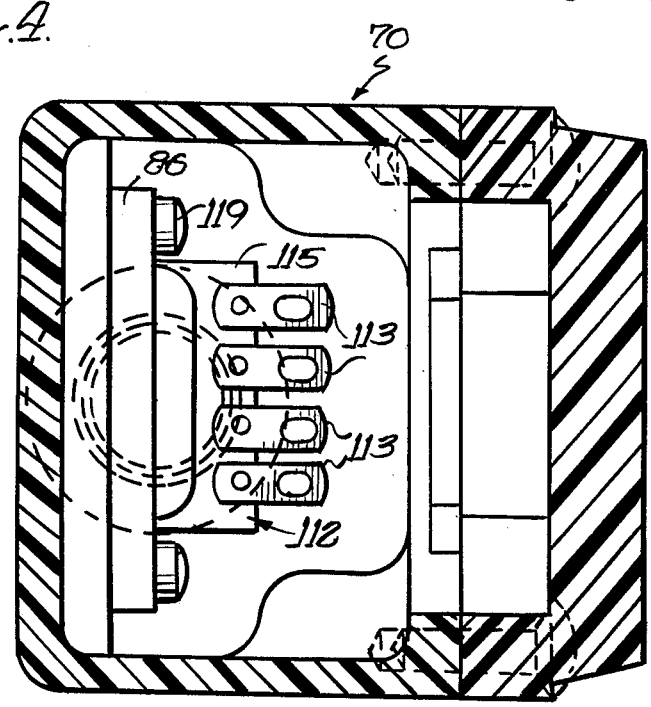

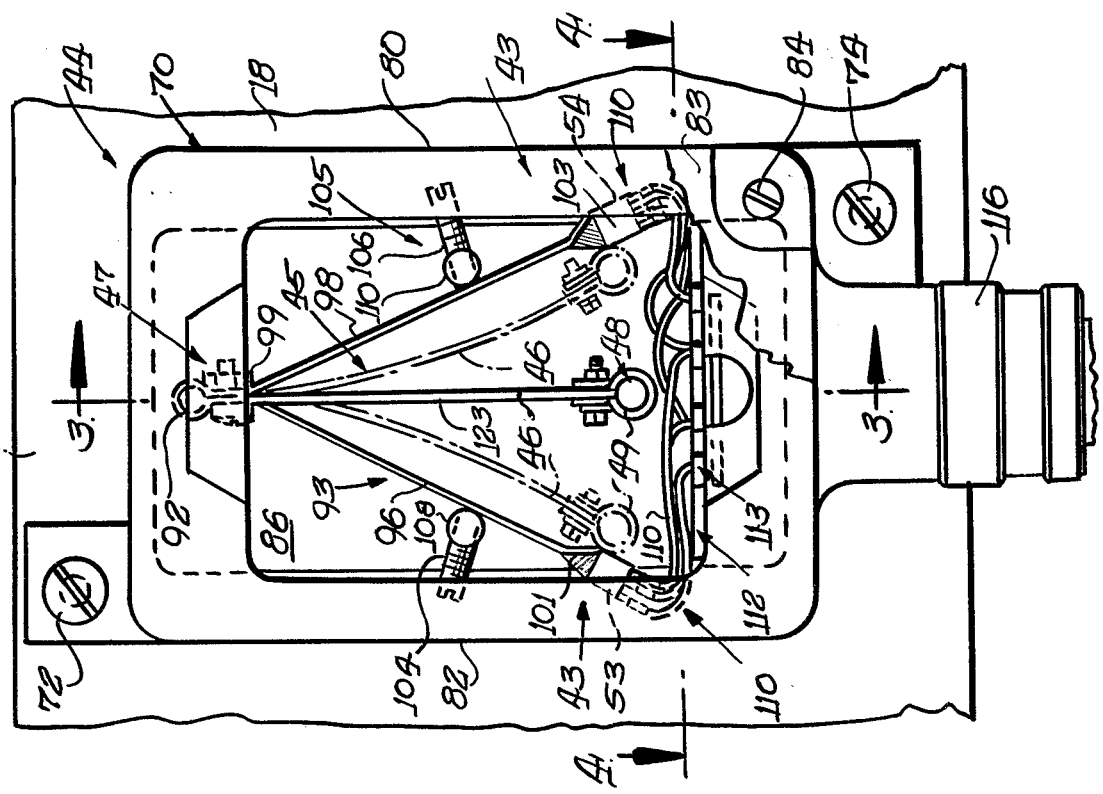

METHOD AND APPARATUS FOR MONITORING VIBRATING EQUIPMENT

BACKGROUND OF THE INVENTION

This invention relates to an apparatus and method for detecting an overstroke, understroke and/or underspeed condition for a piece of vibrating equipment and also to an apparatus which may be attached to vibratory equipment.

The present invention is particularly suited for use with vibratory equipment, such as for example, vibrating screens and conveyors which operate for long periods of time and have amplitudes or frequencies of vibrations which need to be monitored but heretofore have not been monitored. Such vibrating equipment may be part of a production line where a continuous stream of material travels along a vibratory conveyor and/or across a vibratory screening classifier which separates the material thereon by size and/or density. Typically, such equipment undergoes vibratory motion in a direction which is generally parallel to the direction the stream of material is intended to travel. If one part of the vibrating equipment malfunctions, as by vibrating at too great or too small an amplitude, the entire production line may be affected. For example, if one piece of vibrating equipment on a conveyor line vibrates too slowly, less material carried on the conveyor will pass downstream, thus creating a backup of material upstream of the malfunctioning equipment. Conversely, if a piece of equipment vibrates at too great an amplitude or frequency, the equipment can break down, thus requiring an entire production line to be shut down in order to fix the malfunctioning equipment. Often such equipment is unattended and may be in remote areas. Heretofore, a considerable time lag has occurred between the initiation of the equipment's malfunction and the discovery of the malfunction and, in addition, another time lag occurs between the discovery of the malfunction and the shutting down of the production line.

During these time lags, material on the production line can overflow the conveyor, or backup along the entire conveyor line. Often the material on the equipment must be hand shoveled or otherwise manually displaced from the equipment and this is also an expensive and time-consuming operation. Also, the equipment itself may break if allowed to vibrate too rapidly.

In order to detect the malfunctioning of high speed vibratory equipment, it is desired to immediately detect when the equipment is vibrating at an amplitude and/or frequency which is outside of a predetermined range which is compatible with the operating requirements of the equipment. A major problem with monitoring such vibratory equipment is that the equipment operates billions of cycles during its life and the monitoring apparatus must also be capable of operating for billions of cycles. Typically, the cycles per minute are low, for example, about 300 to 1800 cycles per minute and the amplitude of displacement is small, for example, usually about 0.125 to 1.50 inch. But the equipment often is not shut down and runs twenty-four hours per day and 365 days a year. Thus, such equipment soon reaches over a billion cycles per year; and the equipment is expected to operate for eight, ten or more years. A further factor is cost, particularly on retrofitting existing equipment in the field. If the cost of the monitoring apparatus is high, then the conventional manner of operating such equipment without monitoring will be maintained. The monitoring equipment also should be capable of being exposed to dirt, dust and other hostile environmental conditions.

The prior art does include vibration detectors, which operate as inertia detection switches, to provide an output signal when the amplitude of vibration of a piece of vibrating equipment exceeds a predetermined value. One such inertia switch is disclosed in U.S. Pat. No. 3,459,911 and it comprises a spring-biased magnet or weight carried in a housing. The magnet normally occupies a "rest" position. When the amplitude of vibration becomes too large, the magnet or weight is displaced from the rest position to a second position which activates a switch and which can be used to either sound an alarm to alert an operator that the amplitude vibration is too large, or to activate a control circuit to shut down the machine. The problem with the inertia switch is that it can only detect when the amplitude of vibration of the vibrating equipment is too large (overstroke).

Another device which might possibly be used to detect the amplitude and frequency of vibration of vibratory equipment is a strain gauge, a thin piece of metal which produces an output voltage as it is deformed. However, strain gauges, as disclosed in U.S. Pat. No. 3,201,776 are not thought to be suitable for continually monitoring vibration and vibratory equipment having a life operation over 10,000,000 cycles which is the typical life of a conventional strain gauge.

Thus, there is a need for an apparatus capable of monitoring vibratory equipment over a large number of cycles which is durable, and which can provide output signals to either warn an operator of overstrokes or understrokes, or to provide overstroke and understroke signals to control circuits to trigger an adjustment of the equipment to prevent breakdown of the equipment and also to prevent problems from occurring in the entire production line.

DESCRIPTION OF THE DRAWINGS

FIG. 1 is a perspective view of vibratory equipment having a monitoring apparatus constructed in accordance with the present invention mounted thereon;

FIG. 2 shows an enlarged fragmented sideview of the portion of the side of the vibratory equipment which bears the present invention;

FIG. 3 is a cross-sectional view taken along line 3—3 FIG. 2;

FIG. 4 is a cross-sectional view taken through line 4—4 of FIG. 2; and

DETAILED DESCRIPTION

Figure 5:
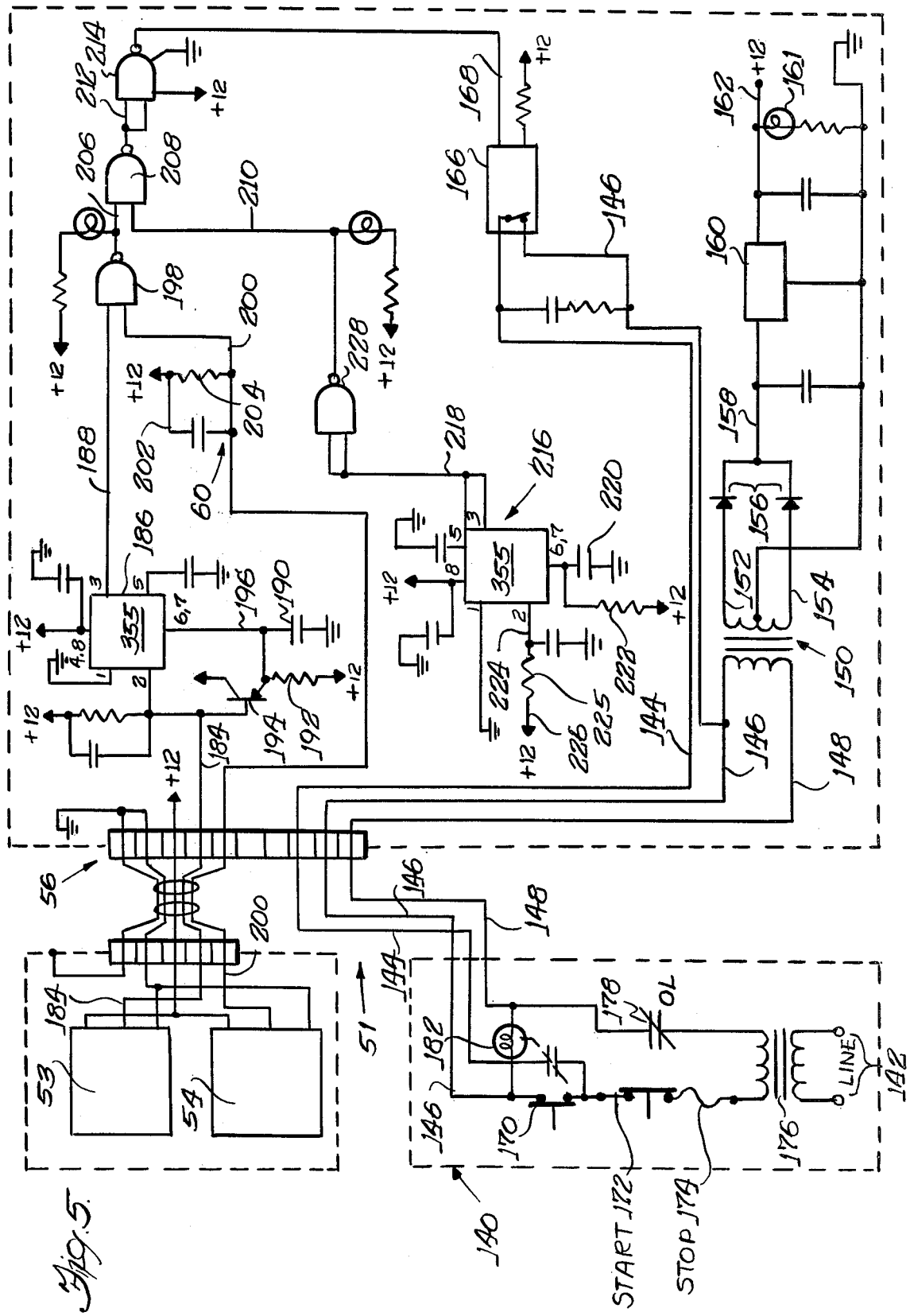
FIG. 5 is a schematic diagram of the control circuit utilized in the present invention.

As shown in drawings for purposes of illustration, the vibration monitoring apparatus 50 is mounted on a vibratory classifier 10 which comprises a motor 12 for inducing vibrating motion in the equipment in the direction of arrow 14 on a horizontal bed 16. The bed 16 is supported between two side rails 18 and 20, which are connected to motor 12 by arm 22 pivotally mounted at pivot 24 to beam 26 which is secured to each of side arms 18 and 20. The classifier 10 further includes legs 28 which are secured to upper side rails 18 and 20 and lower side rails 30 and 32. Secured to upper side rails 18 and 20 and lower side rails 30 and 32 are flexible supports 34. Lower side rails 30 and 32 are joined, as by welding, to a spring mount 36 spanning these side rails. Similarly, upper side rails 18 and 20 are joined and spanned by upper spring mount 38. Between upper spring rail 38 and lower spring rail 36 are disposed two springs 40 and 42 which store and supply the energy for the oscillatory motion caused by motor 12 to give the classifier the desired amplitude and frequency of oscillation. The illustrated classifier 10 is merely illustrative of the many pieces of vibratory equipment to which the device and method of the present invention may be used.

In accordance with the present invention, the vibration monitoring apparatus 50 monitors vibrations of vibrating the equipment for overstrike and/or understroke conditions for long periods of time such as years without wearing out as would conventional devices using electrical contacts which had to open or close or using strain gauges. This is achieved by using solid state signal sensing means (FIG. 2) such as Hall effect switch means 43 mounted on a support means 44 at predetermined locations relative to an oscillatory member 45 which has a motion corresponding to the motion of the vibrating equipment. Herein, the oscillatory member 45 is in the form of a cantilever beam 46 fixed at one end 47 to the mounting means and having means 48 such as a magnet 49 at its other end for actuating the solid state signal means without having to have physical contact therewith. The cantilever beam 46 travels an oscillatory path having an amplitude and frequency corresponding to the amplitude and frequency of the vibrating equipment, as will be explained in detail hereinafter.

The signals from the Hall effect switch means activate a circuit means 51 (FIG. 5) which includes an alarm or control means 52 to give a visual or audio alarm and/or to shut down the vibratory equipment 10.

In accordance with an important aspect of the invention, the vibration monitoring apparatus detects both understrokes and overstrokes. To this end, a pair of Hall effect switches 53 and 54 are disposed on either side of the rest position of the magnet 49. One Hall switch 53 is disposed at a distance from the rest position of the magnet 49 such that when the vibratory equipment 10 is vibrating at a normal amplitude and frequency, the magnet travels with an amplitude or deflection to a position adjacent the Hall switch 53 to induce a voltage in the Hall switch. The second Hall switch 54 is disposed at a greater distance from the rest position of the magnet such that when the vibrating member is vibrating at a normal amplitude, the magnetic field of the magnet does not activate the Hall switch 54. However, when the vibrating member is vibrating at an abnormally large amplitude, the magnetic field created by the magnet 49 induces a voltage in the second Hall switch 54. In this arrangement, understroke (amplitude too small) is detected by an absence of periodic voltage inducement in the first Hall switch 53, and overstroke is detected by the presence of induced voltage in the second Hall switch 54.

The signals generated by the Hall switches in the preferred embodiment are applied to the circuit means 51 which may either activate a warning device, such as a warning light on a control panel or an alarm bell, or can deactivate a control circuit 55 which maintains power supplied to the motor generating the oscillating motion of the vibratory equipment 10. In a preferred arrangement, the circuit means 51 monitors each cycle in which the magnetic field from the magnet 49 induces a voltage in the first Hall switch 53, and detects when either (a) the amplitude of the deflection of the magnet is such that its magnetic field does not induce a voltage in the first Hall switch 53 or (b) when the amplitude of the deflection of the magnet is such that its magnetic field induces voltage in the second Hall switch 54, or (c) when the frequency of the signal from the first Hall switch 53 is too low or slow, i.e., an underspeed stroke condition.

A timer means 56 in the form of a solid-state timer is used to detect the absence of a proper signal in the Hall switch 53 and is continually reset by a pulse from the normal Hall switch 53. If the amplitude or frequency is too low, then the magnet 49 will not actuate the normal Hall switch 53 and the timer means 56 acts as a "missing pulse" detector, usually within a time period of less than one second, to operate the power control circuit 55 to shut off the motor for vibratory equipment. As will also be described, a pulse from an overstroke sensing means in the circuit means 51 will result in turning off the motor.

At start-up, the signals caused by overstroke or a missing pulse are ignored for a predetermined period of time to avoid operation of the alarm or motor shutdown due to generation of large amplitude vibrations or erratic motions. Often during start-up a short resonance condition occurs between vibrating equipment and its suspension system which causes motions which would shut down the equipment if a start-up deactivating means 62 was not provided. As will be explained in greater detail hereinafter, the preferred start-up deactivator means comprises a timing means that is connected to inhibit shutdown for about 35 seconds to allow the start-up to end before the operation of the motor control relay means 58 is returned to the Hall switches 53 and 54.

Referring now to the drawings, a more detailed description will be given of the preferred form of the invention which will now be described in greater detail. The preferred support means 44 comprises a housing 70 which may be secured to side rail 18 by bolts 72 and 74. The housing comprises as back wall 73, top wall 76, bottom wall 78 (see FIG. 3) and sidewalls 80 and 82. The housing is also provided with front cover 83 which is secured removably as by bolts 84.

In accordance with the present invention, the preferred cantilever beam 46 and the Hall switches 53 and 54 are mounted on a common mounting plate 86 which is "potted" with epoxy adhexive into the housing 70 and is spaced from the bottom wall 78 and back wall 73 by the epoxy. The mounting plate 76 is a rectangular aluminum plate in this instance, and carries a horizontally projecting pin 92 at its upper end for supporting both the cantilever beam 46 and a means 93 for mounting the Hall effect switches 53 and 54. The means 93 comprises a generally V-shaped flat leaf spring which has a central looped portion 95 telescoped on the mounting pin 92 and has two legs 96 and 98 depending therefrom. Below the loop portion 95, the legs are perforated to accept a nut and bolt 99 to tighten the loop to clamp onto the pin 92. The lower free ends 101 and 103 of legs 96 and 98 are twisted at a 90 degree angle to form mounting portions for Hall switches 53 and 54 so that Hall switches face the oscillatory path travelled by magnet 49.

To allow quick and easy adjustment in the field of the positions of the Hall effect switches 53 and 54 relative to the at rest position of the magnet 49, an adjustment means 105 is provided. Herein, the adjusting means comprises a pair of adjusting screws 104 and 106 each disposed with their ends bearing on the outer sides of legs 96 and 98 in such a manner as to apply pressure to the outer side of each leg to urge each leg inwardly toward the other against the spring bias thereof and toward the rest position of the magnet (when the vibratory equipment is at rest). Because the legs 96 and 98 have a free state disposition wider than that allowed by the adjusting screws each leg exerts a spring force against its adjusting screw. The force exerted by each arm against the screw must be greater than any transient force exerted on the arm by motion of the vibratory equipment so that the Hall switches do not displace relative to the housing during vibratory motion of the vibratory equipment. Herein the adjusting screws 104 and 106 have hex recesses to receive an "Allen Wrench" to allow turning of the screws in threaded bores in cylindrical mounting rods 108 and 110 which have ends fixed to the mounting plate 86. These rods 108 and 110 project horizontally from the mounting plate and will also act as maximum amplitude stops for the pendulum member 46 if it should swing far enough to hit these rods.

Hall effect switches are well known in the art and utilize the so-called Hall effect wherein an electric current carried in a strip conductor is skewed relative to the conductor when a magnetic field is imposed on the strip conductor. As described in *Machine Design* on page 224 of the May 19, 1977 issue, the Hall effect switch may be a three or four terminal device that puts out a voltage signal in the presence of a magnetic field and switches off the signal when the magnetic field is removed. The switch has two discrete output levels (on or off) with a built-in hysteresis so that the two discrete switching levels produce a built-in noise margin. Hall effect switches typically contain the Hall sensor on a chip about 0.04 inch square. The sensor output voltage is amplified to trigger an output transistor, and the output is available for either current-sourcing (where current leaves the switch to the load) for use with RTL logic or current-sinking (where current enters the switch from the load) for use with TTL and MOS logic. Typical switching speed of the Hall chip is 100,000 operations per second, and the maximum output signal rise and fall times are typically less than 0.5 microseconds.

The magnet 49 which is used to operate the Hall switch must have enough flux density to operate and release the switch at the required distances. The selection of the proper magnet and the Hall effect switches for a particular configuration of the vibration detector of the present invention is within the knowledge of those skilled in the art and need not be described in detail herein.

As can be seen from FIG. 3, the Hall effect switches 53 and 54 face the oscillatory path travelled by the magnet 49 but do not lie in the path. Thus there is no contact between the Hall effect switches and the magnet. Each Hall effect switch is connected by current transmitting wires 110 to terminal strip 112, which is mounted on terminal mount 114, which is secured to mounting plate 86. The illustrated terminal strip 112 has four terminals 113 (FIG. 4). The terminal mount 114, includes a flat horizontal plate 115 carrying the terminals and a tube 117 which are fastened by screws 119 to the lower end of the mounting plate 86. As can be seen from FIG. 3, terminal strip 112 is disposed between the Hall effect switches and a wire outlet 116 at the bottom of the housing 70. Wires run from the control circuit (FIG. 5) through conduit outlet 116 to terminal strip 112.

As can be seen from FIGS. 2 and 3, Hall effect switch 53 is positioned with respect to a first portion of the oscillatory path travelled by magnet 49 and is displaced to one side of the rest position of the magnet such that when the vibrating equipment to which the switch is attached (classifier 10 in this example) is undergoing vibratory motion where the amplitude of vibration is within a predetermined normal range, the pendulum member 46 undergoes oscillatory motion and swings magnet 49 along the oscillatory path. As will be explained, it is preferred that the period of oscillatory motion corresponds to the period of vibratory motion of the vibratory equipment, and that the amplitude of the oscillatory motion of pendulum corresponds to the amplitude of the vibratory equipment 10. The magnetic field created by the magnet induces a voltage in Hall effect switch when positioned closely adjacent and opposite thereto. The output voltage from Hall switch 53 may be transmitted to either a control circuit (discussed below) or a signaling circuit to indicate that the amplitude of vibration of the vibrating member is in the normal range. If, however, the amplitude of vibration of the vibratory member is less than the predetermined range, the pendulum member 46 will deflect to an amplitude less than the amplitude required for the magnetic field created by the magnet to induce a voltage in first Hall effect switch 53. When this occurs, the first Hall effect switch will not generate a signal. The absence of a signal from the first Hall effect switch after a time delay which may be approximately equal to a normal period of oscillation of the pendulum (and thus a normal period of operation for the vibratory equipment) may be used to activate the control circuit 51 for either a shutting down the vibratory equipment or for changing the speed of the motor inducing vibratory motion. Alternatively, the absence of a signal may activate an alarm signal means which may be used to alert an operator to shut down the entire system in which the vibrating equipment is a part to determine what is causing the decrease in amplitude or understroke of the vibrating equipment.

Hall effect switch 54 operates as an "overstroke" detector which senses when the amplitude of vibration of the vibratory equipment 10 is larger than its predetermined normal range. The distance of overstroke Hall switch 54 from the rest position of magnet 49 is greater than the distance of the "understroke" Hall switch 53 from the rest position of magnet 49. When the amplitude of the vibratory motion of the vibrating equipment is greater than a predetermined normal range of amplitude, pendulum member 49 undergoes oscillatory motion having an amplitude which is greater than its amplitude of oscillation when the vibratory equipment is undergoing motion having a normal amplitude, thus causing the magnetic field created by the magnet 49 to induce a voltage in the overstroke Hall switch 54. The induced output voltage of the overstroke Hall switch may be transmitted by electrical transmitting means to either the control circuit 51 which may shut down the equipment, or for that matter the entire system. The induced voltage may, alternatively, or in combination with the control circuit, activate a signal means to alert an operator that the vibrating equipment is vibrating at too great an amplitude.

As mentioned previously, the preferred pendulum member 46 is in the form of a beam extending vertically and fixed at one end to permit it to oscillate along the same direction as the direction of vibration of the vibratory equipment (in this case at an angle as shown by arrow 14). In the illustrated embodiment of the invention, the elongated pendulum beam is of generally rectangular shape having a length which is much greater than its width or thickness. The pendulum beam is fixedly and rigidly secured to pin 92 at its upper end with its sides 123 facing the direction in which it is intended to oscillate when the device 50 is mounted on vibratory equipment. Thus, the sides 123 of the pendulum beam generally face the direction in which the vibratory equipment vibrates. The pendulum beam should be sufficiently rigid or incompressible along its length so that it does not undergo compressive vibratory motion in the direction of its length. It should be sufficiently flexible in a direction perpendicular to the face of the sides (in the direction of arrow 14 in FIG. 2) so that the end upon which magnet 49 is secured will deflect in response to an induced force caused by movement of the vibratory equipment in the direction of arrow 14 when the housing 70 is secured to the equipment as illustrated in FIG. 2.

When the vibrating equipment 10 vibrates in steady state vibratory motion in the direction indicated by arrow 14, a force is transmitted by the vibratory movement of side rail 18 to the pendulum member 46 through its point of attachment to pin 92. Viewing the pendulum member and magnet 49 as a whole, the magnet undergoes oscillatory motion along a path in response to the applied force. It is desirable that the period of this oscillatory motion be identical to the period of the steady state vibratory motion undergone by side rail 18.

For this illustrated embodiment of the invention, the preferred cantilever beam has a high natural frequency and is a rigid member rather than a flexible piano wire or the like. The preferred high natural frequency for the beam allows the amplitude of motion of the magnet and beam to be equal to the relative amplitude of motion for the vibrating equipment so that their amplitudes are essentially equal. For those embodiments of the invention described herein, these amplitudes are in the range of 0.125 to 1.50 inches, by way of example only. The preferred frequency ratio is about 0.7. With the use of such a high naturally frequency cantilever beam any transient motions or vibrations are damped out whereas when a light piano wire was used as a pendulum beam it was found that low frequency motions became superimposed on the piano wire causing it to have a distorted movement. The natural frequency of the cantilever beam is determined by many factors including its width, length, thickness, modulus of elasticity, etc. By way of illustration only the preferred and illustrated pendulum beam is made of fiberglass, which has ultimate tensile strength of about 100,000 psi, and is 0.030 to 0.040 thick by ¼ inch width by a 2¾ inch length. This particular fiber-glass beam with a thickness of 0.040 is particularly useful in the equipment which has a design speed of approximately 680–1,080 rpm. For lower speed ranges of 350–640 rpm the beam's thickness is only 0.030.

The number of cycles to which the device 50 is subjected may reach as high as 50 billion cycles. By way of example, if the apparatus is monitoring a vibratory equipment 10 experiencing 600 revolutions per minute of vibration this is equal to about 36,000 cycles per hour. Most of this equipment runs 24 hours a day which results in about 864,000 cycles per day. Often the equipment runs 365 days a year to provide approximately 3.1 billion cycles per year. If the equipment is run in this manner for ten years, this would be approximately 31 billion cycles. Conventional strain gauges, on the other hand, have life lasting about 10–15 million cycles, which would be only several weeks in such an environment. It is to be understood that with the high natural frequency beam used herein that the amplitude of the magnet 49 is substantially equal to the amplitude of the vibratory equipment but it is at 90 degrees out of phase with the motion of the vibratory equipment.

As discussed above, the output signals from Hall switches 53 and 54 may be transmitted to the control circuit 51 which may, among other things, deactivate the vibratory equipment 10 when it is not vibrating at its normal amplitude, and may also deactivate the entire system of which the vibrating equipment is a part.

An exemplary control circuit 51 for the present invention is shown in FIG. 5. The control circuit which is illustrated controls the power to the motor 28 of vibrating equipment 10 and includes a normal stroke detector responsive to input signals from normal stroke Hall switch 53 which re-sets a timer means during each cycle of oscillation in response to a voltage output from normal stroke Hall switch 53. The circuit also includes a missing pulse detector which disables the motor in the absence of an applied voltage from normal stroke Hall switch 53 after a delay time from the voltage output of the Hall switch 53, which time is sufficient to allow the magnet 49 to travel the oscillatory path over a time period corresponding to the normal period of vibratory motion. The circuit further includes an overstroke detector which disables the motor in response to a voltage induced in overstroke Hall switch 54. When the vibrating equipment is started from a rest condition, it undergoes transcient vibrations which are much larger in amplitude than a predetermined normal range of amplitude for steady state vibration. Because these large amplitude vibrations are merely transcient conditions, the start-up delay means is provided for inhibiting shutdown of the motor due to the detection of a missing pulse from the Hall switch 53 or the detection of an overstroke condition from the Hall switch 54. This delay means is operative for a time sufficient to allow the vibratory equipment to achieve steady state vibratory operation.

Turning now to the specific embodiment of the circuitry shown in FIG. 5, the circuitry is shown to have three separate interconnected portions interconnected the upper left-hand corner of FIG. 5 illustrating the Hall effect switches 53 and 54. Below the Hall effect switches 53 and 54 is a conventional motor starter 140 that is connected to a source of a.c. power via lines 142 and to the control circuitry 51 via lines 144, 146 and 148. Lines 146 and 148 are connected to the primary side of a transformer 150, the secondary of which has lines 152 and 154 respectively connected through two diodes 156 to a line 158 that is connected to a voltage regulator 160 and provides a regulated output voltage of 12 volts on output line 162 that supplies power to the control circuit 51 and the Hall switches 53 and 54. A light emitting diode 161 indicates when power is present from the transformer 150.

Prior to describing the operation of the missing pulse detector, overstroke detector and the delay portions of the circuitry 51, the interaction of the motor starter 140 with the power supply portion of the circuitry 51 will first be described. It should be appreciated that the lines 144 and 146 are connected to a solid-state relay 166 which is normally closed after start-up and which is activated to be opened in response to a high level being provided on input line 168 which occurs as a result of the detection of a missing pulse or as a result of an overstroke signal being supplied from operation of the Hall effect switch 54. Thus, if a high level is applied to line 168, the solid-state relay 166 will open, which will remove power to the primary of the transformer 150 and result in shutdown of the power supply so that voltage will no longer be present on output line 162. This is accomplished by virtue of the fact that line 146 of the motor starter is connected through a normally open start switch 170, a normally closed stop switch 172, fuse 174 to the secondary winding of a transformer 176, and line 148 is connected through an overload contact 178 to other side of the secondary winding of the transformer 176. Line 144 is connected through a normally open contact 180 to the switches 170 and 172 and is closed in response to power being applied to energize its operating coil 182. During operation, depression of the momentary start switch 170 will close the circuit and energize coil 182 which will close the contact 180. As soon as this is accomplished, power will be supplied on lines 146 and 148 which are connected to the transformer 150 in the control circuit 51. However, after the start switch has been depressed, it will open and the coil 182 remains energized only so long as the solid-state relay 166 in the control circuit 51 remains closed. If a missing pulse is detected, for example, so that the solid-state relay 166 is opened, then power will be removed from line 146 and therefore coil 182 and the relay contact 180 will drop out and become open circuited, which will remove power to lines 146 and 148.

Turning now to the missing pulse detection portion of the control circuitry 51, the Hall effect switch 53 has line 184 that extends to a trigger input of a timing circuit 186 which is connected to operate as a missing pulse detector, and which provides a high output signal on line 188 as long as the Hall effect switch 53 provides a low pulse on input line 184 during operation. The low pulse on line 184 effectively resets the timer 186 so that it continually provides a high output on line 188 so long as the pulses continue to arrive within the period before the circuit times out. The time constant of the timer 186 is determined by the values of a capacitor 190 and resistor 192. A transistor 194 has its base connected to input line 184 and is placed into conduction when the low pulses appear on line 184, which effectively discharges the capacitor 190 through line 196, the emitter-base path of the transistor 194 and line 184. When the transistor is switched off, the +12 voltage through resistor 192 and line 196 charges the capacitor 190 and it will exceed a threshold level which is detected by the timer 186 via line 196 when pulses do not appear on the input line 184. Thus, if a low pulse does not occur at the appropriate time on line 184, the timer 186 will provide an indication of the missing pulse by providing a low output on line 188 which is applied to one input of a NAND gate 198, the other input of which is supplied by line 200 which is normally high by virtue of the plus voltage applied to line 202 via resistor 204.

The line 200 is connected to the overstroke Hall effect switch 54 and is normally high except when this Hall effect switch operates to provide a low signal on line 200 in the same manner as Hall switch 53. Since line 200 is normally high and line 188 is normally high when pulses are not missing, the NAND gate 198 output line 206 is normally low. However, the detection of a missing pulse will provide a low pulse on line 188 which will cause the NAND gate 198 to provide a high level on line 206 which is one input of another NAND gate 208 which has a normally high input line 210 and will thereby provide a low level at its output on line 212. This level is inverted by an inverter 214 to provide a high pulse on output line 168 which causes the solid-state relay 166 to open and shut off power to the motor.

In a similar fashion, a low signal produced by the Hall switch 54 will similarly activate NAND switch 198 and result in a high level being produced on line 168 to open the solid-state relay 166 as is desired.

As previously mentioned, the missing pulse detector and the overstroke signals are preferably inhibited from open circuiting the relay 166 during start up, since unusual oscillations and other conditions can occur until the system is stabilized. This is accomplished by another timing circuit 216 that is connected as a one-shot multivibrator having an output line 218 that is normally low after a time period of about 30 to 35 seconds, determined by the time constant produced by a capacitor 220 and resistor 222. It should be understood that the required period for achieving a steady state operation may vary from apparatus to apparatus and the appropriate time constant can be determined to be compatible with the particular apparatus that is being controlled. The trigger is applied via line 224, resistor 225 and line 226 and occurs during start up, with the start up being effective to apply the +12 volts at line 226. Once voltage is applied to line 226, the timer provides a high output pulse on line 218 for the appropriate period of 30 to 35 seconds and this is applied to an inverter 228 having output line 210 which is one input of the NAND gate 208. Thus, during start up, the line 210 is provided with a low voltage which effectively disables NAND gate 208 from gating a high signal on line 206 through to the output 212 even though the missing pulse detector and the overstroke signals may be present and be gated through NAND gate 198 onto line 206. After the timing circuit 216 has timed out, line 218 will again go low which is inverted by inverter 228 to provide a high signal on line 210 which will effectively enable the NAND gate 208 so that the subsequent occurrence of a missing pulse or overstroke signal will result in the dropping out of the solid-state relay 166 as is desired.

From the foregoing a brief description of the operation should be readily apparent that upon suitable operation of the start-stop switches 170 and 172 in the conventional motor starter 140, a plus 12 volts appears on the line 226 for the one-shot multivibrator 216 causing the latter to inhibit operation of the NAND gate 208 for a predetermined period, for example, during the first 30 to 35 seconds of operation of the motor 12, by the expiration of which time a steady state operation of the vibrating equipment should be achieved. At steady state, the pendulum and magnet 49 are operating in accordance with the vibrations of the equipment which will usually continue to operate properly until event occurs to change its manner of vibration. If for some reason the amplitude of the vibrating equipment becomes too large, the magnet 49 will operate the Hall switch 54 to cause operation over line 200 of the NAND gates 198 and 208 resulting in the solid-state relay 166 opening and removing power from the primary side of transformer 150 to cause a shutdown in the power supply so that voltage will no longer be present on output line 162. Likewise, should the Hall switch 53 fail to detect the magnet 49, due to a low amplitude or an underspeed condition of equipment, the Hall switch 53 will fail to reset the timing circuit 186 over line 184 as it has been doing up until the time of faulty operation of equipment. Due to the missing pulse, the timing circuit 186 times out (herein in about 0.2 second) and causes operation of the NAND gates 198 and 208 to open the solid-state relay 166 which results in removing power from the primary of the transformer 150 and thereby voltage from the output line 162. The motor 12 will thus stop. It is to be appreciated that the timing circuit 186 may be adjusted to have different time levels depending on the operation of the equipment involved. If the equipment is operating properly, the magnet 49 operates the Hall switch 53 within 0.2 second and the timing circuit 186 is reset each time by a pulse from the Hall switch.

In the foregoing it will be seen that the present invention provides a new and improved apparatus for detecting overstroke, understroke and/or overspeed, underspeed conditions for a piece of vibrating equipment and particularly vibrating equipment which must operate over long periods of time. The apparatus is relatively simple to install and may be attached to the equipment and connected to its motor control circuit allowing retrofitting of existing equipment as well as being installed on original equipment.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed:

1. An apparatus for detecting understroke or overstroke conditions of a vibrating piece of equipment, said apparatus comprising:
   support means for mounting said apparatus on said vibrating piece of equipment;
   an oscillatory member mounted on said support means for oscillation with said piece of equipment;
   Hall effect switch means positioned on said support means adjacent said member for operation by said oscillatory member; and
   circuit means operated by said Hall effect switch means to provide an alarm signal when said oscillatory member is undergoing an oscillatory motion outside of a predetermined motion.

2. An apparatus in accordance with claim 1 in which said circuit means comprises a timer means and in which said oscillatory member actuates said Hall effect switch means to reset said timer means when said oscillatory member a motion within said predetermined range.

3. An apparatus in accordance with claim 2 in which said oscillatory member carries a magnet and in which a pair of Hall effect switch means are spaced at a predetermined distance apart with said magnet actuating said Hall effect switch means within a predetermined period of time when said oscillatory member is oscillating within said predetermined range of motion.

4. An apparatus in accordance with claim 3 in which said oscillatory member is fixed at its upper end and has a predetermined natural frequency and said magnet is a mass fixed to a lower swinging end of said oscillatory member.

5. An apparatus in accordance with claim 4 in which the frequency ratio for said oscillatory member is less than one.

6. An apparatus in accordance with claim 3 in which said said oscillatory member has a motion with an amplitude of about 0.125 inch to 1.50 inch and the frequency is in the range of 300 to 1800 cycles per minute.

7. A method of detecting understroke or overstroke conditions of a vibrating piece of equipment over a long period of time, said method comprising the steps of:
   moving an oscillatory member on the equipment for having an oscillatory motion in accordance with the oscillatory motion of the equipment;
   operating a solid-state switch means positioned at a predetermined distance from an at rest position for the oscillatory member with each oscillation of said oscillatory member within a predetermined range of amplitude of motion of the equipment and of the oscillatory member;
   operating a timer means and controlling operation of said timer means in accordance with signals from said solid-state switch means; and
   actuating an alarm means when said timer means is in a state indicating that said vibratory member has a motion outside of a predetermined range indicating an understroke or an overstroke for said equipment.

8. A method in accordance with claim 7 including the further steps of:
   swinging said oscillatory movement through an arcuate path with said oscillatory member having a motion with an amplitude approaching the amplitude of said vibrating equipment.

9. A method in accordance with claim 8 including the further steps of:
   operating said timer means for a predetermined period of time and resetting said timer means by a signal from said solid-state switch means to prevent the latter from actuating said alarm means.

10. A method in accordance with claim 9 including the further step of:
    suppressing operation of said timer means and said alarm means for a predetermined period of time during a start up operation of the equipment.

11. An apparatus for sensing amplitude and frequency of vibratory motion in vibrating equipment and for providing output signals indicating when the amplitude and frequency of the vibratory motion are outside of a predetermined range, said apparatus comprising:
    support means on the vibratory equipment;
    oscillatory means disposed on the support means containing signal generating means capable of undergoing oscillatory along an oscillatory path in response to the oscillatory motion of the vibrating equipment;
    signal sensing means positioned with respect to the oscillatory path travelled by the signal generating means for providing output signals relative to the amplitude and frequency of the vibratory motion of the vibrating equipment, wherein the signal generating means and the signal sensing means do not engage in physical contact, said signal generating means comprising a magnet means for generating a magnet field, said signal sensing means comprising a first Hall effect switch positioned with respect to a first portion of the oscillatory path travelled by the magnet means and displaced to one side of the position occupied by the magnet means when the vibratory equipment is at rest, such that when the vibrating member is undergoing vibratory motion where the amplitude of vibration is within a predetermined normal range, the magnetic field created by the magnet means induces a voltage in the first Hall effect switch, and a second Hall effect switch positioned with respect to a second portion of the oscillatory path travelled by the magnet means and displaced to the opposite side of the rest position of the magnet means from the first switch such that when the vibrating member is vibrating at an abnormally large amplitude, the magnet field created by the magnet means induces a voltage in the second Hall effect switch.

12. The apparatus of claim 11 further including control means for maintaining power to a motor which generates the vibratory motion of the vibrating member, the control means activated during each cycle in which the magnetic field from the magnet means induces a voltage in the first Hall effect switch and (a) deactivated when the amplitude of the deflection of the magnetic means is such that its magnetic field (a) does not induce a voltage in the first Hall effect switch, or, (b) induces voltage in the second Hall effect switch.

13. The apparatus of claim 11 wherein the control means includes a normal stroke detector means which resets the timer in response to a voltage output from the first Hall effect switch, a missing pulse detector which disables the motor in the absence of an applied voltage from the first Hall effect switch after a delay time from the voltage output of the first Hall effect swich sufficient to allow the magnetic field of the magnet means to travel the oscillatory path in a normal period of time after a voltage has been induced in the first Hall effect switch, an over-stroke detector which disables the motor in response to a voltage induced in the second Hall effect switch, a delay control circuit for disabling the control means when the motor is started after the vibrating member has been at rest, the delay control circuit overriding the remainder of the control means to provide power to the motor.

14. A device for sensing amplitude and frequency of vibrating motion in vibrating equipment and for providing output signals indicating that the amplitude and/or frequency of the vibrating motion is outside of a predetermined range, said device comprising:
a housing adopted to be attached to the vibrating equipment;
oscillating means including an elongated beam secured near one end to an interior surface of the housing, the other end of the beam bearing a magnet for generating a magnetic field, the magnet-bearing end of the beam capable of undergoing oscillatory motion along an oscillatory path in response to the vibratory motion of the vibrating equipment, a first Hall effect switch positioned with respect to a first portion of the oscillatory path travelled by the magnet means and displaced to one side of the position occupied by the magnet means when the vibratory equipment is at rest, such that when the vibrating member is vibrating in a normal amplitude and frequency, the magnet field created by the magnet means induces a voltage in the first Hall effect switch, and a second Hall effect switch positioned with respect to a second portion of the oscillatory path travelled by the magnet means and displaced to the opposite side of the rest position of the magnet means from the first switch such that when the vibrating member is vibrating at an abnormally large amplitude, the magnetic field created by the magnet means induces a voltage in the second Hall effect switch.

15. The device of claim 14 wherein means are provided for adjustably supporting each of said first and second Hall effect switches.

16. The device of claim 15 wherein the means for adjustably positioning the Hall effect switches comprises two arms of rigid material, each arm having an inner portion for mounting on the housing and an outer portion for carrying a Hall effect switch, the inner portion of each arm secured to the housing in close proximity to the inner portion of each other arm in a manner to cause the outer portion of each arm to deflect outwardly from the rest position of the magnet when the vibratory equipment is at rest, the outer portion of each arm carrying a Hall effect switch in a position opposite a portion of the oscillating portion travelled in the magnet means; and screw means for adjustably applying pressure to the outer side of each arm to urge each arm toward the rest position of the magnet when the vibratory equipment is at rest.

17. A method for sensing amplitude of vibratory motion in vibrating equipment and for providing output signals indicating the amplitude of the vibratory motion to a control system for the vibrating equipment, said method comprising:
generating a normal signal pulse for each period of oscillation of the vibrating equipment when the equipment is vibrating in a predetermined normal range of amplitude, activating a timer reset circuit with each normal pulse, in absence of a normal pulse within a predetermined time period generating an abnormal pulse for disabling the motor of the vibrating equipment, and generating an abnormal pulse in response to vibrations in the vibrating equipment which are greater than predetermined normal range of amplitude of vibration of such equipment and disabling the motor of the vibrating equipment.

18. The method of claim 17 including the step of:
disabling said generating of abnormal signals for a period of time after the vibrating equipment has been started up from rest, the time being sufficient to allow the vibrating equipment to achieve steady state operating condition.

19. An apparatus for monitoring vibrations in vibrating equipment and for controlling the same, said apparatus comprising:
a vibrating member for movement with said vibrating equipment, an understroke switch means operable by said vibratory member during each cycle of operating of said equipment at said normal vibrations,
a timing means resettable upon operation of said first switch means, said timing means generating a missing pulse abnormal signal if not reset within a predetermined time period, an overstroke switch means for sensing vibrations of an amplitude larger than a predetermined amplitude and for generating an abnormal pulse signal,
control circuit means operable by an abnormal pulse signal to cause a shutdown of the vibrating equipment,
and start-up means operable for a predetermined initial period of time during initial start-up of the vibrating equipment to inhibit operation of said control circuit means by an abnormal signal during said predetermined initial period of time.

* * * * *

UNITED STATES PATENT AND TRADEMARK OFFICE
CERTIFICATE OF CORRECTION

PATENT NO. : 4,369,398
DATED : January 18, 1983
INVENTOR(S) : George W. Lowry, Sr.

It is certified that error appears in the above-identified patent and that said Letters Patent is hereby corrected as shown below:

Column 4, line 19, "described" should read -- explained --.

Column 7, line 59, "fiber-glass" should read -- fiberglass --.

Column 13, line 30, "swich" should read -- switch --.

Signed and Sealed this

Twenty-ninth Day of January 1985

[SEAL]

Attest:

DONALD J. QUIGG

Attesting Officer    Acting Commissioner of Patents and Trademarks